United States Patent
Weber

(10) Patent No.: US 9,574,932 B2
(45) Date of Patent: Feb. 21, 2017

(54) ROBOT-ACTUATED DOOR-OPENING DEVICE FOR A DRAFT SHIELD ENCLOSURE OF AN ANALYTICAL BALANCE

(71) Applicant: Mettler-Toledo AG, Greifensee (CH)

(72) Inventor: René Weber, Esslingen (CH)

(73) Assignee: Mettler-Toledo GmbH, Greifensee (CH)

( * ) Notice: Subject to any disclaimer, the term of this patent is extended or adjusted under 35 U.S.C. 154(b) by 182 days.

(21) Appl. No.: 14/661,727

(22) Filed: Mar. 18, 2015

(65) Prior Publication Data

US 2015/0276471 A1    Oct. 1, 2015

(30) Foreign Application Priority Data

Mar. 28, 2014    (EP) .................................... 14162219

(51) Int. Cl.
| | |
|---|---|
| *G01B 21/28* | (2006.01) |
| *B25J 19/06* | (2006.01) |
| *B25J 21/00* | (2006.01) |
| *G01G 21/28* | (2006.01) |
| *B25J 9/02* | (2006.01) |

(52) U.S. Cl.
CPC .............. *G01G 21/286* (2013.01); *B25J 9/023* (2013.01); *B25J 19/06* (2013.01); *B25J 21/00* (2013.01)

(58) Field of Classification Search
CPC ............... B25J 21/00; B25J 19/06; B25J 9/02; B25J 9/023; G01G 21/286
See application file for complete search history.

(56) References Cited

U.S. PATENT DOCUMENTS

| | | | |
|---|---|---|---|
| 4,789,034 A | | 12/1988 | Luchinger et al. |
| 5,606,153 A | | 2/1997 | Fix, Sr. et al. |
| 5,607,276 A | * | 3/1997 | Muka ................ H01L 21/67772 414/331.18 |
| 5,609,459 A | * | 3/1997 | Muka ................ H01L 21/67772 414/217.1 |
| 5,644,925 A | * | 7/1997 | Chaves .................. F24F 13/22 137/192 |

(Continued)

FOREIGN PATENT DOCUMENTS

| | | | | |
|---|---|---|---|---|
| EP | 1912047 A1 | | 4/2008 | |
| EP | 2924401 A1 | * | 9/2015 | ........... G01G 21/286 |

(Continued)

*Primary Examiner* — Randy Gibson
(74) *Attorney, Agent, or Firm* — Standley Law Group LLP

(57) ABSTRACT

A device (14) allows a door of a balance draft shield enclosure (12) to be activated by a carrier fork (4) of a robot (5). The vertically movable draft shield door (13) sets open an access opening in a raised position and closes the opening in a lowered position. A door-lifter with a force-application element (41) is connected to the draft shield door for application of an upward-directed vertical force. A transmitting mechanism (15), standing clear of the balance (11) includes a force-receiving element (20, 21, 26, 27) that is moved vertically by the carrier fork, between upper and lower end positions. It further includes at least one direction-reversing element (22, 23, 24, 25, 29), coupled to the force-receiving element for coupling to the force-application element, a return spring (28), and a spring-biased locking latch (30).

18 Claims, 4 Drawing Sheets

(56) References Cited

U.S. PATENT DOCUMENTS

| | | | | |
|---|---|---|---|---|
| 6,378,191 B1* | 4/2002 | County | ............... | B23P 19/105 |
| | | | | 29/407.08 |
| 6,520,726 B1* | 2/2003 | Cook | ............... | H01L 21/67766 |
| | | | | 414/217 |
| 6,955,197 B2* | 10/2005 | Elliott | ............... | H01L 21/67353 |
| | | | | 141/93 |
| 7,227,088 B2* | 6/2007 | Luechinger | ......... | G01G 21/286 |
| | | | | 177/180 |
| 7,560,651 B2* | 7/2009 | Nufer | .................. | G01G 21/30 |
| | | | | 177/145 |
| 8,517,342 B2* | 8/2013 | Dunca | ............... | E04F 21/0023 |
| | | | | 254/131 |
| 9,031,697 B2* | 5/2015 | Huang | ................. | B25J 5/005 |
| | | | | 414/730 |
| 2006/0045679 A1* | 3/2006 | Ostendorff | ............ | B25J 5/007 |
| | | | | 414/402 |
| 2013/0034660 A1* | 2/2013 | Koyanagi | ......... | B05B 13/0292 |
| | | | | 427/424 |
| 2013/0054029 A1* | 2/2013 | Huang | ................ | B25J 5/005 |
| | | | | 700/259 |

FOREIGN PATENT DOCUMENTS

| | | | | |
|---|---|---|---|---|
| JP | 61-194366 A | * | 8/1986 | ............ G01N 35/00 |
| WO | 2014/038969 A1 | | 3/2014 | |

* cited by examiner

ROBOT-ACTUATED DOOR-OPENING DEVICE FOR A DRAFT SHIELD ENCLOSURE OF AN ANALYTICAL BALANCE

CROSS-REFERENCE TO RELATED APPLICATIONS

This application is entitled to benefit of a right of priority under 35 USC §119 from European patent application 14162219.1, filed on 28 Mar. 2014, the content of which is incorporated by reference as if fully recited herein.

TECHNICAL FIELD

The disclosed invention concerns a robot-actuated device serving to open and close the door of a draft shield compartment of an analytical or micro-analytical balance for use in an automated laboratory system. The invention further concerns a method for the opening and closing of a draft shield door that is designed in accordance with the invention.

BACKGROUND

Automated laboratory systems in which weighing processes are performed with the help of robots belong to the known state of the art. Such systems are normally used in situations where weighing operations are performed serially in large numbers, where the automation brings labor cost savings and improved reliability.

A typical example for an automated serial weighing process occurs in the weighing of filters that are used in air pollution tests, for example in the testing of diesel engines. In these tests, the exhaust gases that are to be tested are sent through a filter which holds back solid particles, in particular soot particles. The filters which are individually marked and traceable are weighed a first time in their new, unused condition, and the initial weight of each filter is registered in a database. The filters are then used for collecting the particles in the equipment under test and are subsequently weighed again. Next, the net weight of the combustion residues collected by the filter is determined by subtracting the initial weight from the end weight.

A system for the weighing of filters with the help of robots is described for example in U.S. Pat. No. 5,606,153, wherein the flat, circular filters are seated in ring-shaped holders that carry a barcode identification. Arranged on a vibration-isolated weighing table are a swivel-arm robot, a microbalance, an electrostatic discharging device, a carousel tray holding the filters, as well as a device for temporarily parking the ring-shaped holder of the filter that is in the process of being weighed. To carry out a weighing operation, the robot first transports a filter that is seated in a ring-shaped holder from the carousel tray to the temporary parking station, where the filter is separated from the ring-shaped holder device. The robot then moves the filter without the ring-shaped holder through the electrostatic discharging device to the microbalance, where the functions of the balance—opening and closing the door, setting the balance to zero, recording the weighing result and transmitting it to a computer—run automatically and are coordinated with the movements of the robot. The filter is returned to the temporary parking device and inserted into the ring-shaped holder, whereupon the ring-shaped holder with the filter is returned to the carousel tray.

In the robotic weighing system of the foregoing description, a commercially available microbalance is used in which the aforementioned, normally manual functions can also be executed automatically, i.e. in response to control commands of a computer. However, with this kind of balance, one has to accept that a balance that is designed to satisfy the ergonomic requirements of manual operation and of a wide range of applications will in some respects not be optimally tailored to the needs of automated filter weighing. In particular, a draft shield enclosure in the standard version of a commercially available microbalance has a taller interior space than is necessary for filter weighing. With a lower profile of the draft shield enclosure, the air turbulence associated with the opening and closing of the weighing compartment door could be reduced and the settling time of transient oscillations of the balance could be shortened. In addition, if the balance is operated automatically, the draft shield enclosure does not need to be transparent and can therefore be made of metal, whereby the problem of electrostatic charges is eliminated.

A filter-weighing system which was developed by the applicant and which is being distributed in Germany by the firm Horiba under the name PWS ONEplus™ includes an XYZ-robot, a microbalance, a rack for holding the filters with several shelves arranged vertically above each other, as well as a computer to control the system and to process and store the data. The flat, circular-shaped filters are individually contained in suitably shaped receptacles which carry a barcode identification, whereby the filter that is currently held by the receptacle is individually identified. The bottoms of the receptacles have a circular opening whose diameter is smaller than the filter diameter, but larger than the weighing-pan diameter of the microbalance. To weigh a filter, the receptacle is moved to a centered position over the weighing pan and lowered onto the floor of the weighing compartment, whereby the filter is transferred to the weighing pan and lifted off the receptacle bottom. Consequently, the filter does not have to be taken out of the receptacle for the weighing.

The microbalance in the filter-weighing system just described is a serial-production model manufactured by the applicant. It has a transparent, cylindrical draft-protection enclosure made of glass, with a cylindrically curved sliding door that opens and closes in a swivel movement about the cylinder axis, driven by a motor that is controlled by command signals from the computer. Due to the concept of the filter-weighing receptacles, the problem of electrostatic charge accumulation on the filter is avoided with this filter, but as in the earlier example, the standard-production draft-protection enclosure is taller than would be necessary for filter-weighing.

To meet the objections against the use of a standard-production draft shield enclosure, the applicant's first approach was to develop a low-profile draft shield enclosure that was made of metal and tailored specifically to work with the filter-weighing receptacles, but keeping the electric motor-driven door of the standard-production version. It was found, however, that the control of the door movement cannot be coordinated rigidly enough with the movement flow of the robot and that, as a consequence, the draft shield compartment door occasionally opens too late or not at all, causing the robot arm to collide with the closed draft shield door, whereby the filter-weighing system can become damaged.

The present invention therefore has the objective of providing a door-opening device for a balance draft shield enclosure that is optimally matched to the conditions imposed by a robotically operated filter-weighing system and which, in comparison to the existing state of the art, is distinguished by a simple, cost-effective design and by its functional reliability. In view of the robot being available for use, the motor drive and electronic control that are used in the standard version can be dispensed with, and the robot can also be put to work for the operation of the door-opening device.

SUMMARY

This task is solved by the door-opening device for a draft shield enclosure in accordance with the features of the independent claim. Advantageous embodiments and details of the draft shield enclosure are presented in the dependent claims. In the following, expressions such as "top", "bottom", "horizontal", "vertical" always relate to the operation-ready position of the draft shield enclosure in the installed state on the balance.

A door-opening device according to the invention for a balance draft shield enclosure with a vertical, laterally arranged loading access opening and with a vertically movable draft shield door which in the raised position sets the access opening free and in the lowered position closes it up is designed to be operated through mechanical actuation by a carrier fork of a robot. The door-opening device includes on the one hand a door-lifter that is connected to the door and includes a force-application element for an upward-directed vertical force which causes the door to open, and on the other hand a transmitting mechanism that stands clear of the balance and includes a force-receiving element which, through the action of the carrier fork, is vertically movable between an upper and a lower end position. Further parts of the door-opening device are at least one direction-reversing element that is coupled to the force-receiving element and can be coupled to the force-application element, a return spring that pulls the force-receiving element into the upper end position, as well as a spring-biased locking latch which arrests the force-receiving element in the lower end position.

To open the draft shield door, the force-receiving element is pushed downward by the carrier fork against a resetting force of the return spring, whereby the direction-reversing element is brought into engagement with the force-application element and the upward-directed actuating force is generated which causes the door to be opened. When the fully open position of the door has been attained, the transmitting mechanism is arrested as the spring-biased locking latch snaps shut, so that the draft shield door remains in the open position, while the carrier fork can be removed from the force-receiving element.

To close the draft shield door, the carrier fork is moved into position above the force-receiving element, and the arrestment of the transmitting mechanism is released by a sideways-directed push of the carrier fork against the spring-biased locking latch. As the force-receiving element is released from arrestment, it is pushed against the carrier fork by the weight of the draft shield door acting on the direction-reversing element, whereupon the draft shield door returns under its own weight to the closed position at a speed that is controlled by the robot. After the draft shield door has reached the closed position, the return spring fully retracts the force-receiving element into the upper end position, whereby the engagement between the direction-reversing element and the force-application element is released.

In a preferred embodiment of the draft shield enclosure according to the invention, the door lifter which is connected to the draft shield door includes a vertically directed second push rod which is axially guided by second glide bushings in a vertical bore of the draft shield enclosure and which carries at its lower end a second wheel fork with a second roller wheel.

In a further preferred embodiment, the transmitting mechanism has a chassis base, and the force-receiving element is configured as a vertically oriented first push rod which carries at its upper end a push knob against which the carrier fork can exert a force and at its lower end a first roller wheel mounted in a first wheel fork. The first push rod is axially guided by first glide bushings in a vertical bore of the chassis base.

The direction-reversing element is advantageously configured as at least one lever which has its fulcrum in the chassis base and is rotatable in a vertical plane of movement, with a first lever arm being held by the return spring in permanent pressure-transmitting engagement with the first roller wheel, while a second lever arm can be brought into pressure-transmitting engagement with the second roller wheel.

The direction-reversing element can be realized in particular as a pair of levers that are mounted in the chassis base vertically above each other and are coupled to each other by a coupling member constraining the two levers to swing up and down together, wherein the first lever arm belongs to a first of the two levers and the second lever arm belongs to the second of the two levers.

The spring-biased locking latch in an advantageous embodiment is configured as a leaf spring element which is fastened to the chassis base in the immediate vicinity of the force-receiving element, wherein the leaf spring element has a catch opening and the force-receiving element has a projecting latch pin which snaps into the catch opening when the force-receiving element arrives at its lower end position.

BRIEF DESCRIPTION OF THE DRAWINGS

Details of the door-opening device according to the invention will become apparent from the description of the example that is shown in the drawings, wherein.

DETAILED DESCRIPTION

Figure 1:
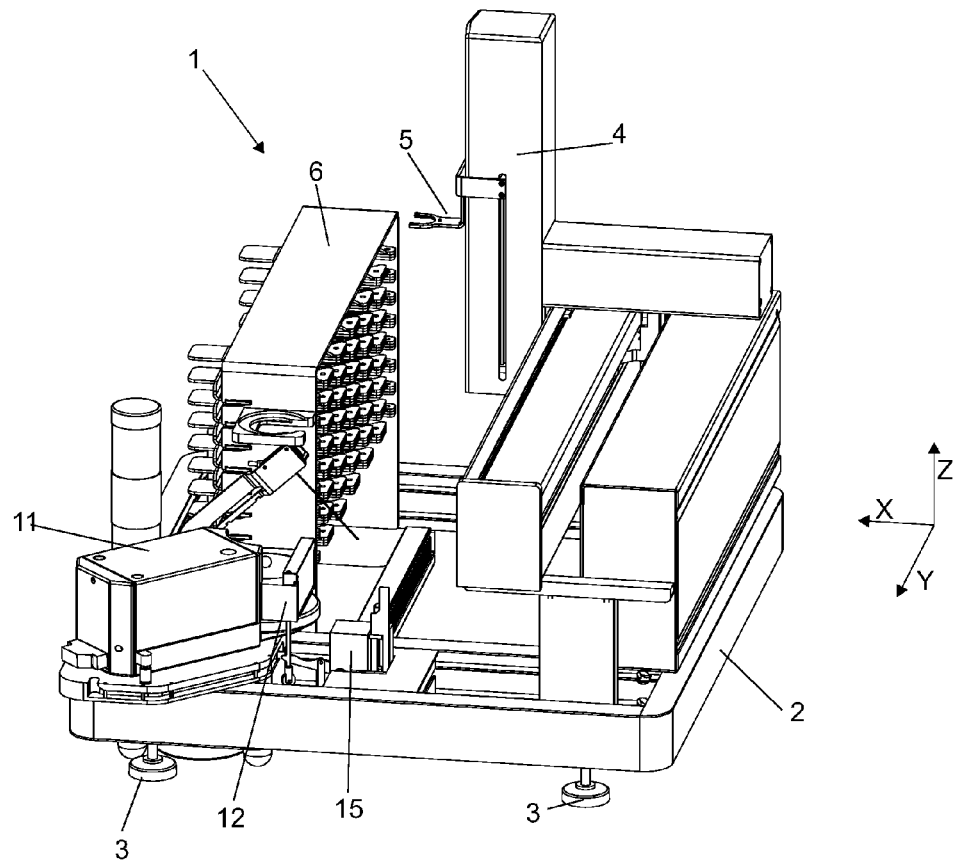
FIG. 1 represents an overall view of a filter-weighing system equipped with the door-opening device according to the invention.

FIG. 1 shows a three-dimensional overall view of a filter-weighing system 1 that is equipped with the door-opening device according to the invention, wherein the entire system is arranged on a base plate 2 with level-adjusting feet 3. The robot 4 with the carrier fork 5 which is movable in the x-y-z directions of a Cartesian coordinate system is shown in the right-hand part of the drawing. Arranged opposite the robot is the holding rack 6 for the filter-weighing receptacles 7 containing the filters 8 that are to be weighed (see FIG. 1*a*). The microbalance 11, oriented along the diagonal of the base plate 2, with the draft shield enclosure 12 and the vertically movable draft shield door 13, can be seen to the left in the foreground. To the right of the microbalance 11 is the transmitting mechanism 15 which represents the main portion of the door-opening device 14 which is shown in detail in FIGS. 2 to 5.

Figure 1A:
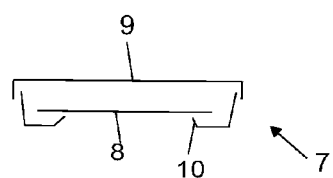
FIG. 1a represents a filter-weighing receptacle with a filter in a schematic cross-sectional view

FIG. 1*a* shows a filter-weighing receptacle 7 containing a filter 8. The receptacle 7 is covered by a lid 9, and the floor of the receptacle 7 has an opening 10. The filter 8, which needs to be weighed a first time in its new condition prior to use and again in the sooted condition after use, is handled for example with a pair of tweezers and laid into the receptacle 7 where, due to the conically shaped inside wall of the receptacle 7, the filter 8 centres itself over the opening 10. A holding rack 6 filled with receptacles 7 that have been loaded in this manner with filters 8, is set into the filter-weighing system 1.

Figure 2:
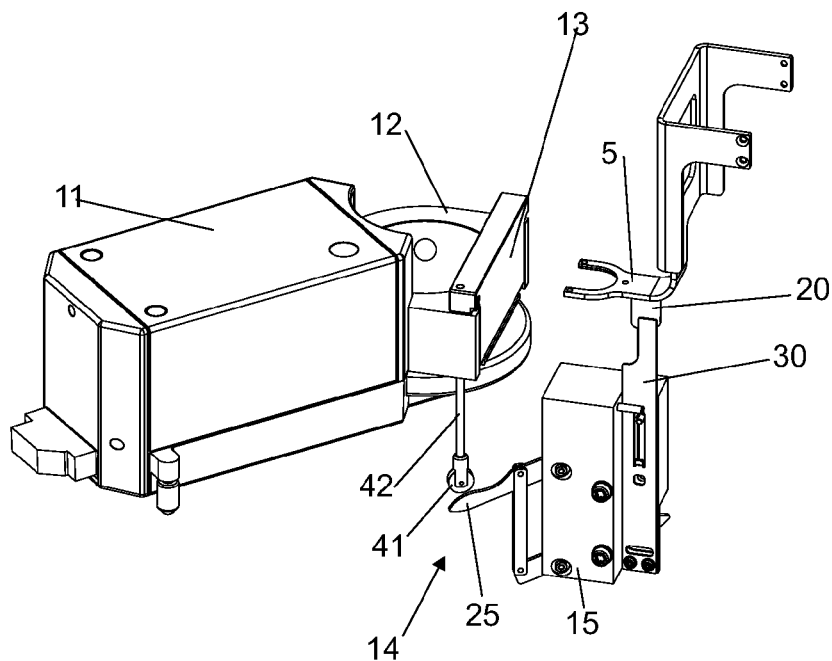
FIG. 2 shows the balance with the door-opening device in the closed door position.
Figure 3:
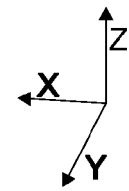
FIG. 3 shows the balance with the door-opening device in the open door position.
Figure 3:
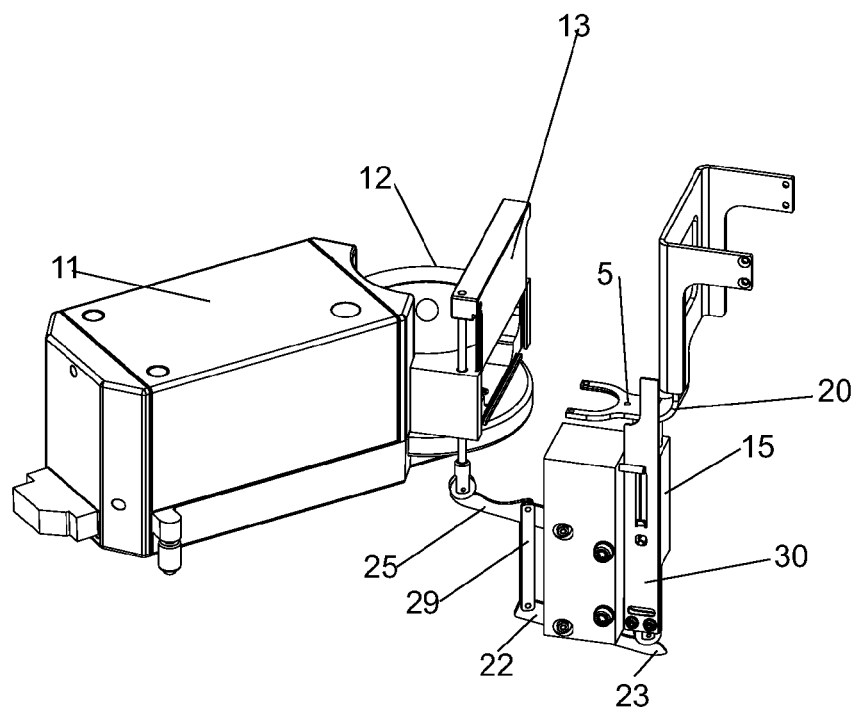

FIGS. 2 and 3 show the microbalance 11 with the draft shield enclosure 12 as well as the door-opening device 14 with the transmitting mechanism 15 in the same orientation relative to the robot coordinates x, y, z as in FIG. 1. In FIG. 2, the draft shield door 13 is in the closed position and in FIG. 3 in the open position. In FIG. 2, the carrier fork 5 can be seen positioned above the knob 20 of the push rod which is held in its upper end position by a spring tension of the transmitting mechanism 15 (for details see FIG. 5), but the carrier fork 5 is not yet applying pressure to the push knob 20.

As the carrier fork 5 is being lowered, it pushes the knob 20 of the push rod downward (see FIG. 3), whereby the first lever arm 23 is moved downward and the second lever arm 25 is simultaneously moved upward. The second lever arm 25 comes first into contact with the second roller wheel 41. With a further lowering of the carrier fork 5, the knob 20 of the push rod is moved down to its lower end position, where the transmitting mechanism 14 is arrested by a latch pin 32 (see FIG. 5) snapping into a catch opening 34 of the spring-biased locking latch 30. As a consequence of the downward movement of the push rod knob 20 which is transmitted through the second lever arm 25, the second roller wheel 41 and the second push rod 42, the draft shield door 13 is raised to the open position and held there due to the locking arrestment of the transmitting mechanism 15.

The carrier fork 5 can now be removed from the push knob 20 and moved, e.g., to the draft shield enclosure 12 in order to take out a filter-weighing receptacle 7 that has just been weighed, or to deliver a filter-weighing receptacle 7 that needs to be weighed (not shown here).

To close the draft shield door 13, the carrier fork 5 is first moved into a position slightly above the push knob 20 which is locked in its lower end position. With a brief sideways push of the carrier fork 5 against the spring-biased locking latch 30, the arrestment is released and the push rod with the knob 20 is pushed upwards against the carrier fork 5 by the weight of the draft shield door 13 as well as the tension force of the return spring 28. A controlled upward movement of the carrier fork 5 allows the transmitting mechanism 15 to return to the upper end position of the push knob 20, whereupon the carrier fork 5 is available again for further operations.

Figure 4:
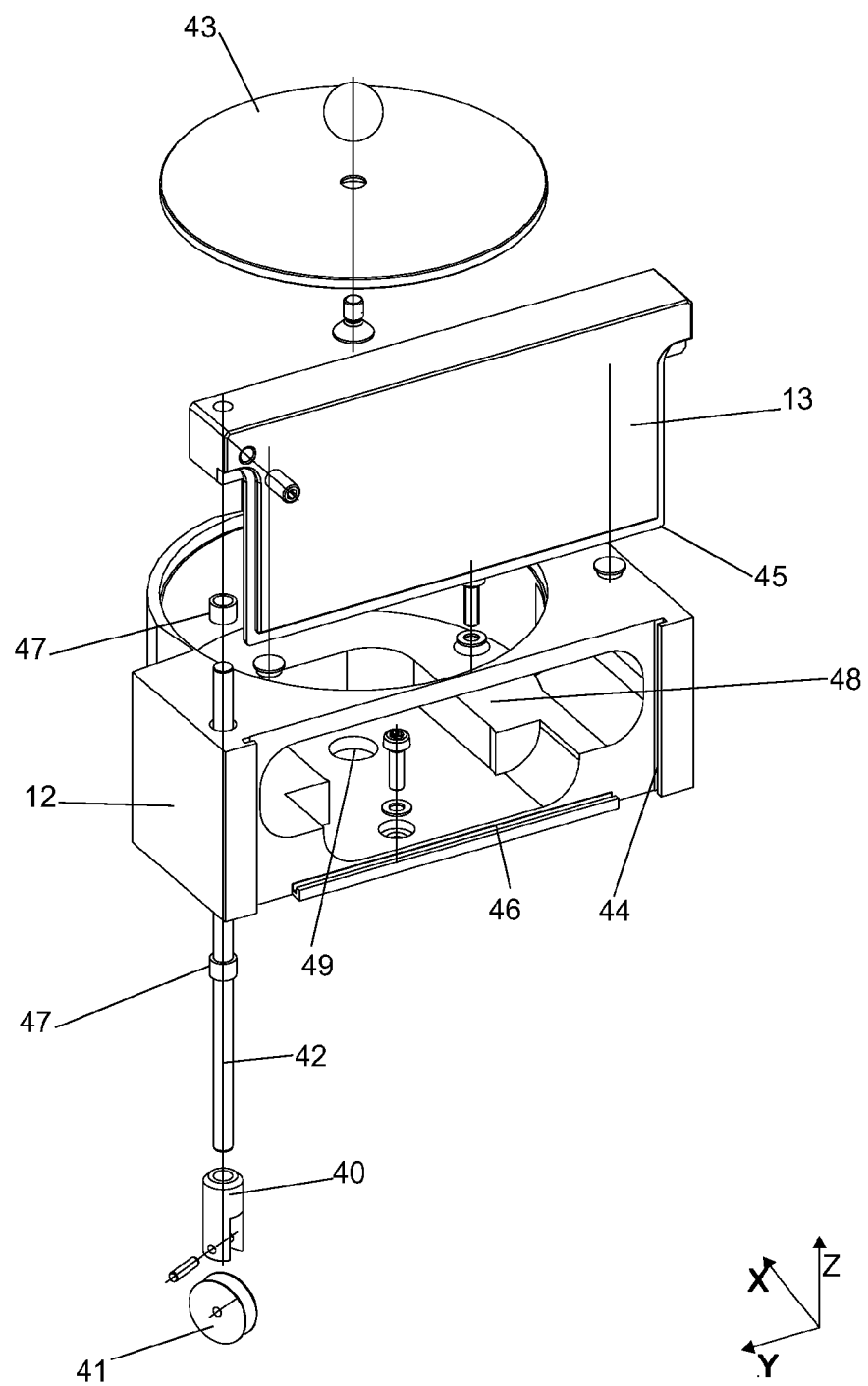
FIG. 4 shows an exploded view of the draft shield enclosure designed for automated filter weighing, with the door being movable by the opening device according to the invention.

FIG. 4 shows an exploded view of a preferred embodiment of a draft shield enclosure 12 with a removable lid 43 and a draft shield door 13 that is operable with the door-opening device 14 according to the invention. The coordinate axes X, Y, Z defined in FIG. 1, are repeated here in order to visualize the orientation of the draft shield enclosure 12. The draft shield door 13 is vertically movable, guided by lateral track grooves 44 of the draft shield enclosure 12 which also seal out air drafts. In the closed state, the bottom edge 45 of the draft shield door 13 is engaged in a groove 46 which likewise serves to seal out air drafts. The door lifter is constituted by the second push rod 42 which is guided by second glide bushings 47 in a vertical bore of the draft shield enclosure 12. The upper end of the second push rod 42 is solidly connected to the draft shield door 13, while the lower end carries the second roller wheel 41 which is mounted in a second wheel fork 40 and serves as force-application element. Illustrated features located inside the draft shield enclosure 12 include the U-shaped supporting ledge 48 for the filter receptacles 7 as well as the passage opening 49 for the weighing pan support (not shown). In order to weigh a filter inside a receptacle 7, the latter is lowered vertically towards the weighing pan and set down on the supporting ledge 48, while the filter 8 inside the receptacle 7 is lifted off the receptacle floor by the weighing pan. The filter 8 is not taken out of the receptacle 7 for the weighing (and during the entire time the filter 8 is inside the filter-weighing system 1).

Figure 5:
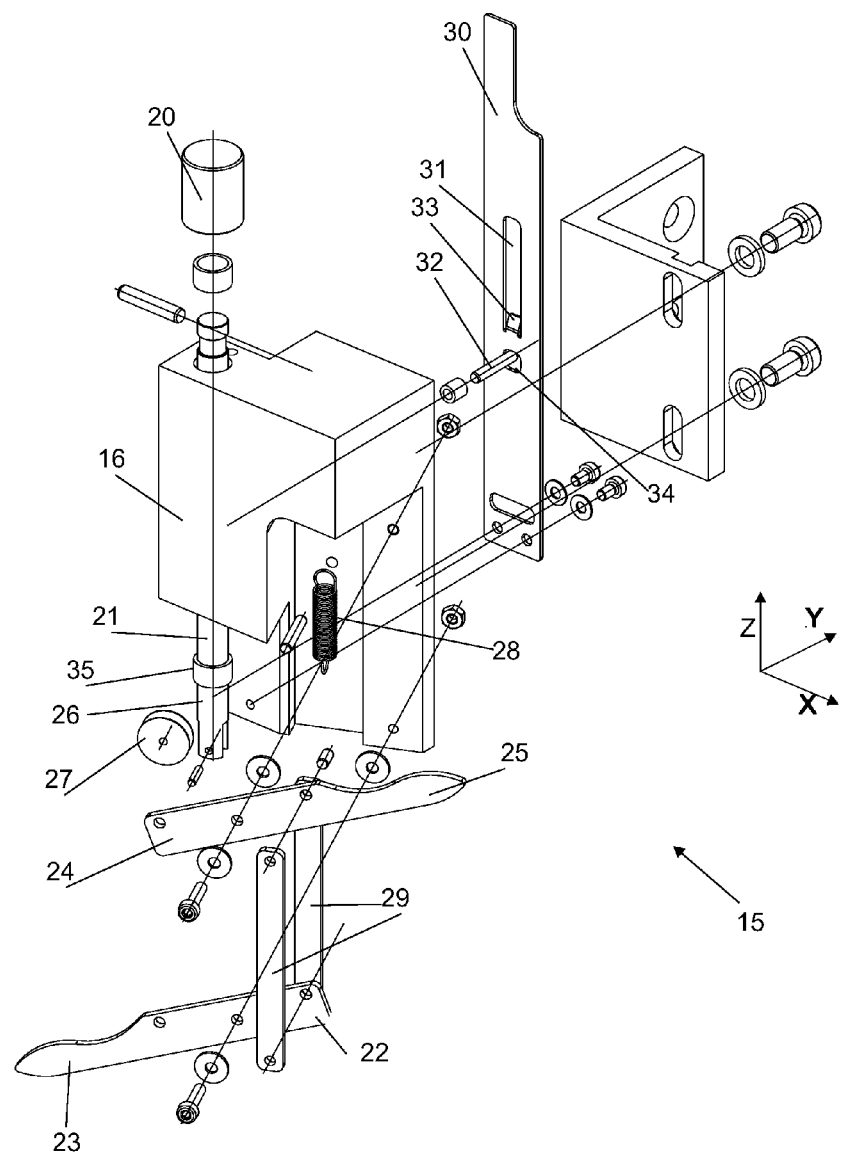
FIG. 5 represents the transmitting mechanism in an exploded view.

FIG. 5 shows the details of the transmitting mechanism 15 in an exploded view. The coordinate axes X, Y, Z defined in FIG. 1, are repeated here once again in order to visualize the orientation of the transmitting mechanism 15. The first push rod 21, which is connected to the push knob 20, is guided in gliding motion in a vertical bore of the chassis base 16 and carries at its lower end the first roller wheel 27 which is mounted in a first wheel fork 26. The first lever 22 whose fulcrum is supported by the chassis base 16 is biased against the first roller wheel 27 by the return spring which is attached to the chassis base 16. By way of the coupling member 29, the first lever 22 is connected to the second lever 24, which likewise has its fulcrum in the chassis base 16 and is, in turn, actuating the draft shield door 13 through the engagement of the second lever arm 25 with the second roller wheel 41 and further through the second push rod 42.

In the illustrated example, the spring-biased locking latch 30 is configured as a leaf spring element 30 that is fastened to the chassis base 16. As the push knob 20 is pushed downward by the carrier fork 5, the latch pin 32 which is connected to the first push rod 32 and reaches through the opening 31 of the leaf spring 30 meets the tongue 33 and, through gliding contact with the latter, pushes the leaf spring 30 away from the chassis base 16 and ends up snapping into the catch opening 34.

Although the invention has been described through the presentation of the specific example of filter weighing, it will be evident to the reader that the invention can also be used for robotic weighing systems for other applications and that numerous further variant embodiments could be developed from the teachings of the present invention, for example by using only one lever instead of the first and second levers that are connected by a coupling member, or by replacing the lever mechanism for example with a gear mechanism or a Bowden cable. Also, it should be explicitly emphasized that the invention is not limited to a Cartesian robot system. A door-opening device according to the invention can also cooperate for example with a swivel arm robot that is programmable in cylindrical or spherical coordinates. It is considered self-evident that variants of these kinds are to be considered as lying within the scope of the present invention.

What is claimed is:

1. A device for operating a door of a draft shield enclosure of a balance, the door being movable vertically to provide access to the balance through an access opening in which a raised position of the door provides access and a lowered position of the door closes the access opening, the device mechanically actuated by a carrier fork of a robot, the device comprising:
- a door-lifter, connected to the door, comprising a force-application element for applying an upward-directed vertical force to open the door; and
- a transmitting mechanism, standing clear of the balance, the mechanism comprising:
  - a force-receiving element that moves vertically between an upper end position and a lower end position through the action of the carrier fork;
  - at least one direction-reversing element, coupled to the force-receiving element and arranged for coupling to the force-application element;
  - a return spring, arranged to pull the force-receiving element into the upper end position; and
  - a locking latch, biased by a spring to arrest the force-receiving element in the lower end position.

2. The device of claim 1, wherein:
the force-receiving element, when pushed downward by the carrier fork against a resetting force of the return spring, establishes a force-transmitting connection to the force-application element, by way of the direction-reversing element, and generates an upward-directed actuating force which opens the door until the locking latch snaps shut, arresting the transmitting mechanism, when the door reaches the fully raised position.

3. The device of claim 2, wherein:
the locking latch is pushed sideways by the carrier fork, releasing the arrestment of the transmitting mechanism;
the force-receiving element, the transmitting mechanism thereof being released from arrestment, is pushed upward against the carrier fork by the weight of the door, in the raised position, which acts on the direction-reversing element through engagement by the force-application element; allowing the weight of the door to move the door from the raised position to the lowered position, the speed of the movement controlled by the robot, and
the return spring fully retracts the force-receiving element into the upper end position when the door reaches the closed position, releasing the engagement of the direction-reversing element and the force-application element.

4. The device of claim 3, wherein:
the door lifter comprises:
- a push rod, oriented in a vertical direction in a vertical bore of the draft shield enclosure, which carries, at a lower end thereof, a wheel fork with a roller wheel that act as the force-application element; and
- guide bushings that guide the push rod in the vertical bore.

5. The device of claim 4, wherein:
the transmitting mechanism further comprises a chassis base;
the force-receiving element comprises:
- a push rod, oriented in a vertical direction in a vertical bore of the chassis base, which carries, at an upper end thereof, a push knob arranged to receive a force exerted by the carrier fork and, at a lower end thereof, a roller wheel mounted in a wheel fork; and
- guide bushings that axially guide the push rod in the vertical bore.

6. The device of claim 5, wherein:
the direction-reversing element comprises at least one lever, mounted in the chassis base for rotation in a vertical plane, with a first lever arm being held by the return spring in permanent pressure-transmitting engagement with the roller wheel of the force-receiving element and a second lever arm thereof arranged to be brought into pressure-transmitting engagement with the roller wheel of the door lifter.

7. The device of claim 6, wherein:
the direction-reversing element comprises two levers, each mounted in the chassis base in coupled vertical relationship by a coupling member that constrains the respective levers to swing up and down together, wherein the first lever arm, held by the return spring in permanent pressure-transmitting engagement with the roller wheel of the force-receiving element, is associated with the first of the two levers and the second lever arm, arranged to be brought into pressure-transmitting engagement with the roller wheel of the door lifter, is associated with the second of the two levers.

8. The device of claim 5, wherein:
the force-receiving element has a projecting latch pin, and the locking latch comprises a leaf spring element fastened to the chassis base in the immediate vicinity of the force-receiving element, such that the projecting latch pin snaps into a catch opening of the leaf spring when the force-receiving element arrives at the lower end position.

9. The device of claim 1, wherein:
the locking latch is pushed sideways by the carrier fork, releasing the arrestment of the transmitting mechanism;
the force-receiving element, the transmitting mechanism thereof being released from arrestment, is pushed upward against the carrier fork by the weight of the door, in the raised position, which acts on the direction-reversing element through engagement by the force-application element; allowing the weight of the door to move the door from the raised position to the lowered position, the speed of the movement controlled by the robot, and
the return spring fully retracts the force-receiving element into the upper end position when the door reaches the closed position, releasing the engagement of the direction-reversing element and the force-application element.

10. The device of claim 3, wherein:
the door lifter comprises:
- a push rod, oriented in a vertical direction in a vertical bore of the draft shield enclosure, which carries, at a lower end thereof, a wheel fork with a roller wheel that act as the force-application element; and
- guide bushings that guide the push rod in the vertical bore.

11. The device of claim 1, wherein:
the transmitting mechanism further comprises a chassis base;
the force-receiving element comprises:
- a push rod, oriented in a vertical direction in a vertical bore of the chassis base, which carries, at an upper end thereof, a push knob arranged to receive a force exerted by the carrier fork and, at a lower end thereof, a roller wheel mounted in a wheel fork; and
- guide bushings that axially guide the push rod in the vertical bore.

12. The device of claim 3, wherein:
the transmitting mechanism further comprises a chassis base;
the force-receiving element comprises:
- a push rod, oriented in a vertical direction in a vertical bore of the chassis base, which carries, at an upper end thereof, a push knob arranged to receive a force exerted by the carrier fork and, at a lower end thereof, a roller wheel mounted in a wheel fork; and
- guide bushings that axially guide the push rod in the vertical bore.

13. A method for operating a door of a draft shield enclosure of a balance, the door movable between a raised position and a lowered position, the method comprising the steps of:
- associating a door-operating device according to claim 1 with the door, the door-opening device comprising actuating elements; and
- actuating the door-operating device to move the door from one of the positions to the other, through a purely mechanical action of a carrier fork of a robot directed at the actuating elements.

14. The method of claim 13, wherein:
the robot is a Cartesian XYZ-robot.

15. The method of claim 13, wherein:
the robot is a swivel arm robot.

16. The method of claim 13, wherein:
the step of actuating the door-operating device comprises:
an opening procedure, comprising the substeps of:
- moving the carrier fork into a position immediately above the push knob while the push knob is in an upper end position;
- moving the carrier fork vertically downward to push the push knob down sufficiently to snap the arrestment device into lock, moving the door to the raised position and holding the door in the raised position; and a closing procedure, comprising the substeps of:
- moving the carrier fork into a position immediately above the push knob while the push knob is locked in a lower end position by the arrestment;
- pushing the carrier fork laterally against the locking latch, releasing the arrestment and returning the door-opening mechanism to the upper end position of the push knob in a movement that is propelled by the weight of the door and the tensile force of the return spring and braked by the carrier fork.

17. The method of claim 16, wherein:
the opening procedure is performed by the carrier fork while is holding a filter-weighing receptacle.

18. The method of claim 16, wherein:
the closing procedure is performed by the carrier fork while is holding a filter-weighing receptacle.

* * * * *